(12) United States Patent
Frissenbichler

(10) Patent No.: US 11,673,744 B2
(45) Date of Patent: Jun. 13, 2023

(54) SHELVING SYSTEM HAVING A SHUTTLE VEHICLE

(71) Applicant: FB Industry Automation GmbH, Albersdorf-Prebuch (AT)

(72) Inventor: Werner Frissenbichler, St. Kathrein am Offenegg (AT)

(73) Assignee: FB Industry Automation GmbH, Albersdorf-Prebuch (AT)

( * ) Notice: Subject to any disclaimer, the term of this patent is extended or adjusted under 35 U.S.C. 154(b) by 0 days.

(21) Appl. No.: 16/760,397

(22) PCT Filed: Oct. 30, 2018

(86) PCT No.: PCT/EP2018/079643
§ 371 (c)(1),
(2) Date: Apr. 29, 2020

(87) PCT Pub. No.: WO2019/086413
PCT Pub. Date: May 9, 2019

(65) Prior Publication Data
US 2020/0339349 A1    Oct. 29, 2020

(30) Foreign Application Priority Data
Oct. 30, 2017   (DE) ..................... 10 2017 219 431.6

(51) Int. Cl.
*B65G 1/04*    (2006.01)
*B65G 1/06*    (2006.01)

(52) U.S. Cl.
CPC ......... *B65G 1/0492* (2013.01); *B65G 1/0435* (2013.01); *B65G 1/065* (2013.01)

(58) Field of Classification Search
CPC combination set(s) only.
See application file for complete search history.

(56) References Cited

U.S. PATENT DOCUMENTS

| 3,556,329 A | 1/1971 | Robert |
| 4,459,078 A | 7/1984 | Chiantella et al. |

(Continued)

FOREIGN PATENT DOCUMENTS

| AT | 511140 A1 | 9/2012 |
| CN | 105705441 A | 6/2016 |

(Continued)

OTHER PUBLICATIONS

PCT/EP2018/079643, Jan. 31, 2019, International Search Report and Written Opinion.

(Continued)

*Primary Examiner* — Kyle O Logan
(74) *Attorney, Agent, or Firm* — Wolf, Greenfield & Sacks, P.C.

(57) ABSTRACT

A shuttle vehicle is provided for transporting stored goods in a shelving system. The shuttle vehicle includes a running gear having wheels mounted thereon in order to move the shuttle vehicle along guide rails of the shelving system. A telescopic system is movably guided at the running gear, which can be retracted and extended relative to the running gear in a plane in a self-supporting manner on both sides of the running gear A lifting system is provided for raising and lowering the telescopic system relative to the guide rails of the shelving system. A shelving system is also provided which uses the shuttle system.

17 Claims, 11 Drawing Sheets

(56) References Cited

U.S. PATENT DOCUMENTS

| | | | |
|---|---|---|---|
| 11,084,410 B1* | 8/2021 | Bhaskaran | B66F 9/063 |
| 2002/0070099 A1 | 6/2002 | Neely | |
| 2010/0320010 A1 | 12/2010 | Bo | |
| 2013/0094926 A1* | 4/2013 | Olszak | B66F 9/183 |
| | | | 414/277 |
| 2014/0205423 A1 | 7/2014 | Yamashita | |
| 2014/0271069 A1 | 9/2014 | Salichs et al. | |
| 2014/0277689 A1* | 9/2014 | Salichs | B65G 1/1371 |
| | | | 700/214 |
| 2015/0081089 A1* | 3/2015 | Kapust | B65G 1/0435 |
| | | | 700/218 |
| 2016/0060037 A1 | 3/2016 | Razumov | |
| 2018/0134488 A1 | 5/2018 | Grosse et al. | |
| 2018/0370726 A1 | 12/2018 | Grosse et al. | |
| 2018/0370729 A1 | 12/2018 | Ueda et al. | |
| 2019/0283966 A1 | 9/2019 | Mariusse et al. | |
| 2021/0214160 A1 | 7/2021 | Frissenbichler | |

FOREIGN PATENT DOCUMENTS

| | | |
|---|---|---|
| CN | 112249631 A | 1/2021 |
| DE | 32 07 860 A1 | 9/1982 |
| DE | 91 03 498 U1 | 8/1991 |
| DE | 43 27 382 A1 | 2/1995 |
| DE | 10 2013 013 274 A1 | 2/2015 |
| DE | 10 2014 012 254 A1 | 2/2016 |
| DE | 10 2015 202141 A1 | 8/2016 |
| DE | 20 2016 107 020 U1 | 1/2017 |
| DE | 10 2016 105 677 A1 | 10/2017 |
| EP | 3 395 724 A1 | 10/2018 |
| JP | 55-070606 A2 | 5/1980 |
| JP | 56-043108 A2 | 4/1981 |
| JP | 2016-531060 A | 10/2016 |
| KR | 10-2017-0026074 A | 3/2017 |
| KR | 10-2018-0047169 A | 5/2018 |
| WO | WO 2012/011219 A1 | 1/2012 |
| WO | WO 2014/009797 A1 | 1/2014 |
| WO | WO 2015/038999 A2 | 3/2015 |

OTHER PUBLICATIONS

PCT/EP2018/079643, May 14, 2020, International Preliminary Report on Patentability.

International Search Report and Written Opinion for International Application No. PCT/EP2018/079653, dated Jan. 31, 2019.

International Preliminary Report on Patentability for International Application No. PCT/EP2018/079653, dated May 14, 2020.

International Search Report and Written Opinion for International Application No. PCT/EP2018/079643, dated Jan. 31, 2019.

International Preliminary Report on Patentability for International Application No. PCT/EP2018/079643, dated May 14, 2020.

Japanese Office Action dated Dec. 21, 2022, in connection with Japanese Application No. 2020-543727.

* cited by examiner

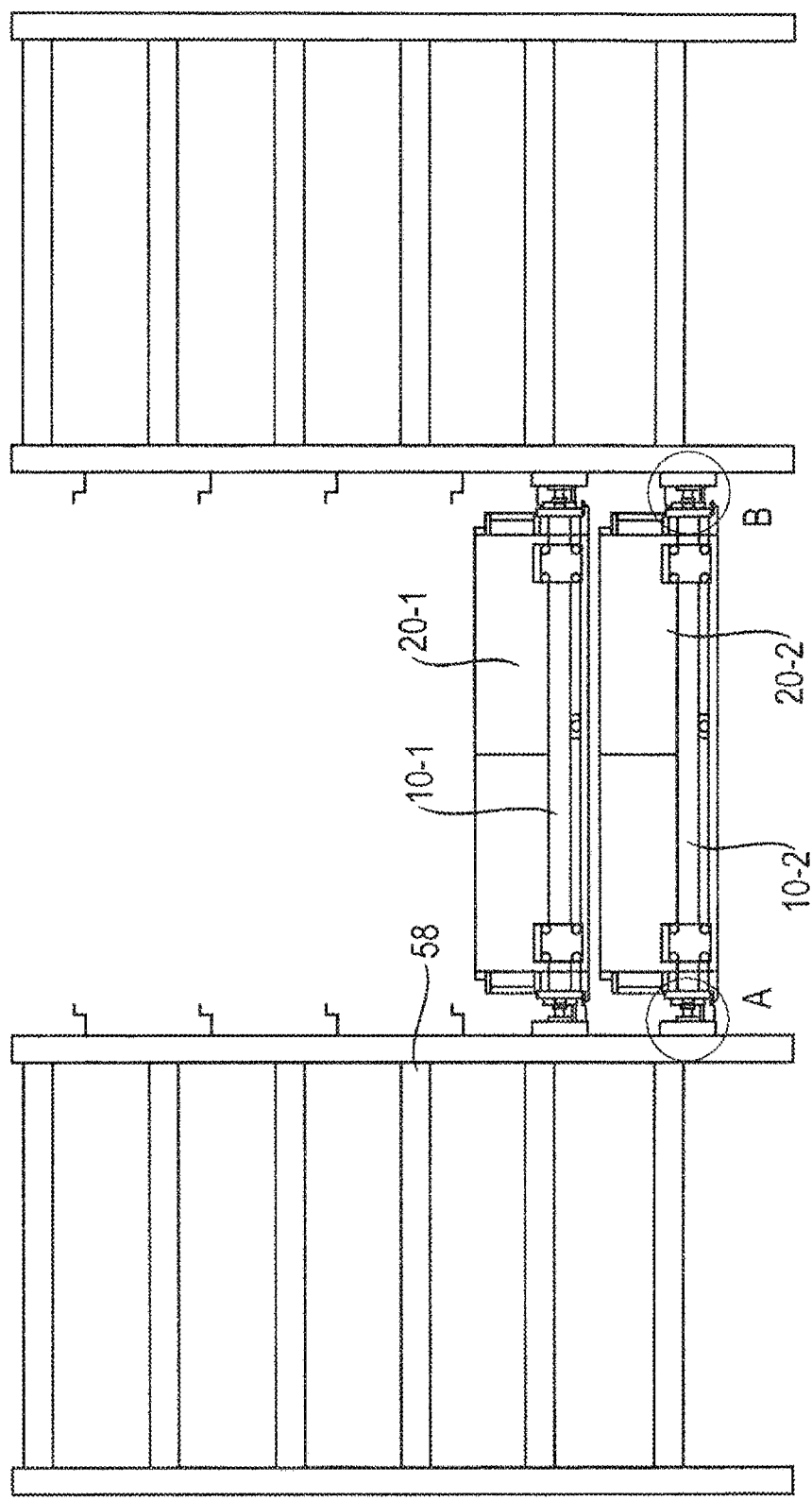

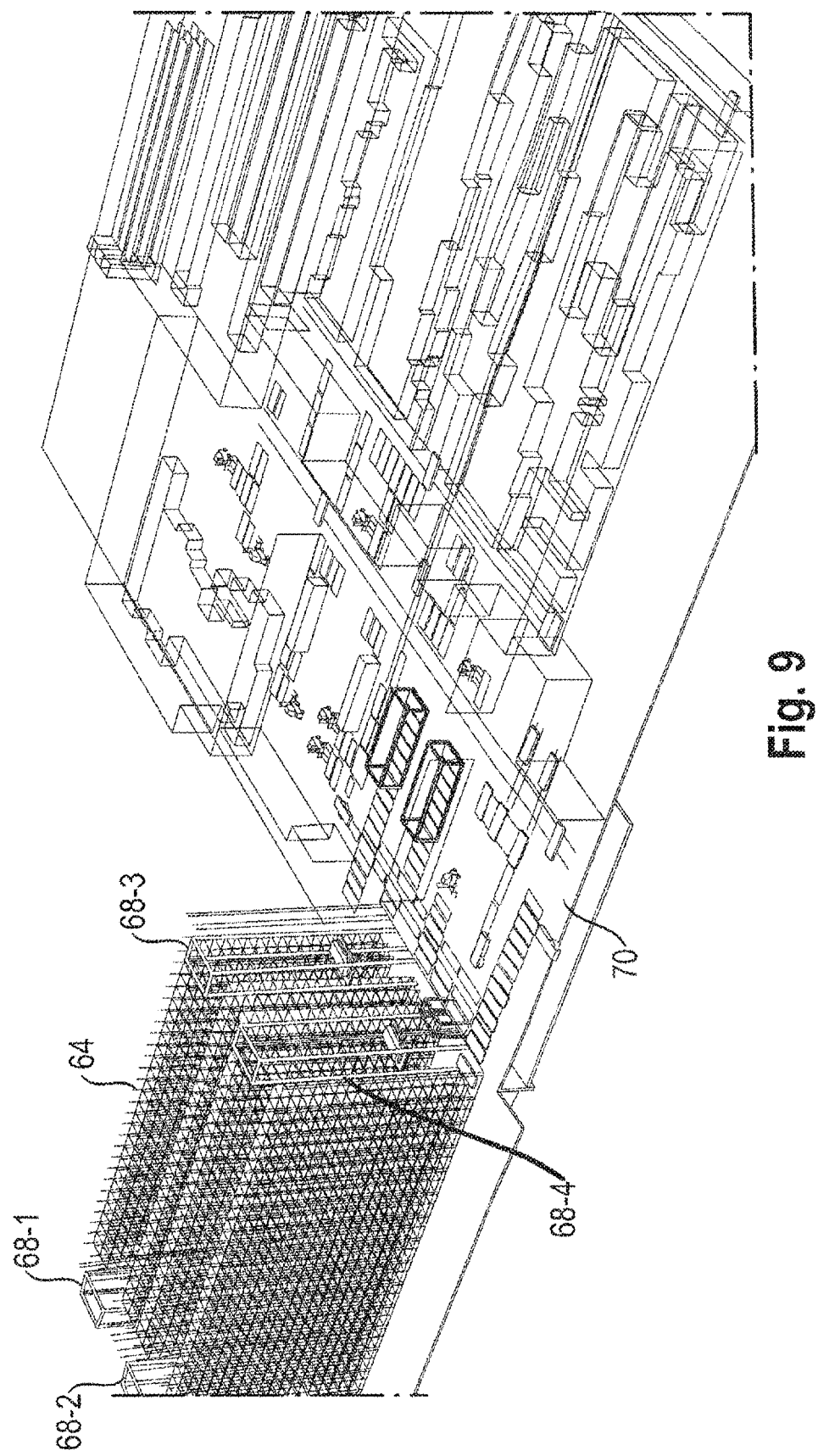

SHELVING SYSTEM HAVING A SHUTTLE VEHICLE

CROSS-REFERENCE TO RELATED APPLICATIONS

This Application is a national stage filing under 35 U.S.C. 371 of International Application Serial No. PCT/EP2018/079643, filed Oct. 30, 2018, which claims priority to German application no. 10 2017 219 431.6, filed Oct. 30, 2017, each of which is herein incorporated by reference in their entirety.

The present invention relates to a shelving system having a shuttle vehicle, and in particular a shelving system having a shuttle vehicle, in which a telescopic underfeeding technique is used for storing and retrieving loads.

In existing storage systems and small parts storages, storage and retrieval systems provide the basis for loading and retrieving articles from storage boxes of a storage system.

However, such storage and retrieval devices are regularly slow and restricted with regard to the storage depth.

In addition, such ground conveying vehicles regularly require additional space for maneuvering, so that their use leads to a reduction of the capacities available for storage.

Accordingly, the technical problem of the present invention is to increase the flexibility and efficiency of a storage system.

According to the present invention, this technical problem is solved with a shuttle vehicle according to patent claim 1.

The shuttle vehicle for transporting stored goods in a shelving system, as according to the invention, comprises a running gear having wheels mounted thereon in order to move the shuttle vehicle along guide rails of the shelving system, a telescopic system movably guided at the running gear, which can be retracted and extended relative to the running gear in a plane in a self-supporting manner on both sides of the running gear, and a lifting system for raising and lowering the telescopic system relative to the guide rails of the shelving system.

Moreover, the technical problem of the present invention is solved by a shelving system according to patent claim 13.

According to the invention, the shelving system comprises at least one storage plane, in which a plurality of storage spaces is arranged at right angles. At least one straight shuttle passage per storage plane runs between opposite outer sides of the shelving system, comprising guide rails running along storage spaces of this storage plane. In addition, a shuttle vehicle according to the invention can be moved along the guide rails of the shuttle passage in at least one shuttle passage of the storage system for storing and retrieving stored goods.

Further advantageous embodiments of the present invention are indicated in the dependent patent claims.

Preferred embodiments of the present invention are described below with reference to the drawings.

FIG. 9 shows a perspective view of the storage system according to the invention.

Figure 1:
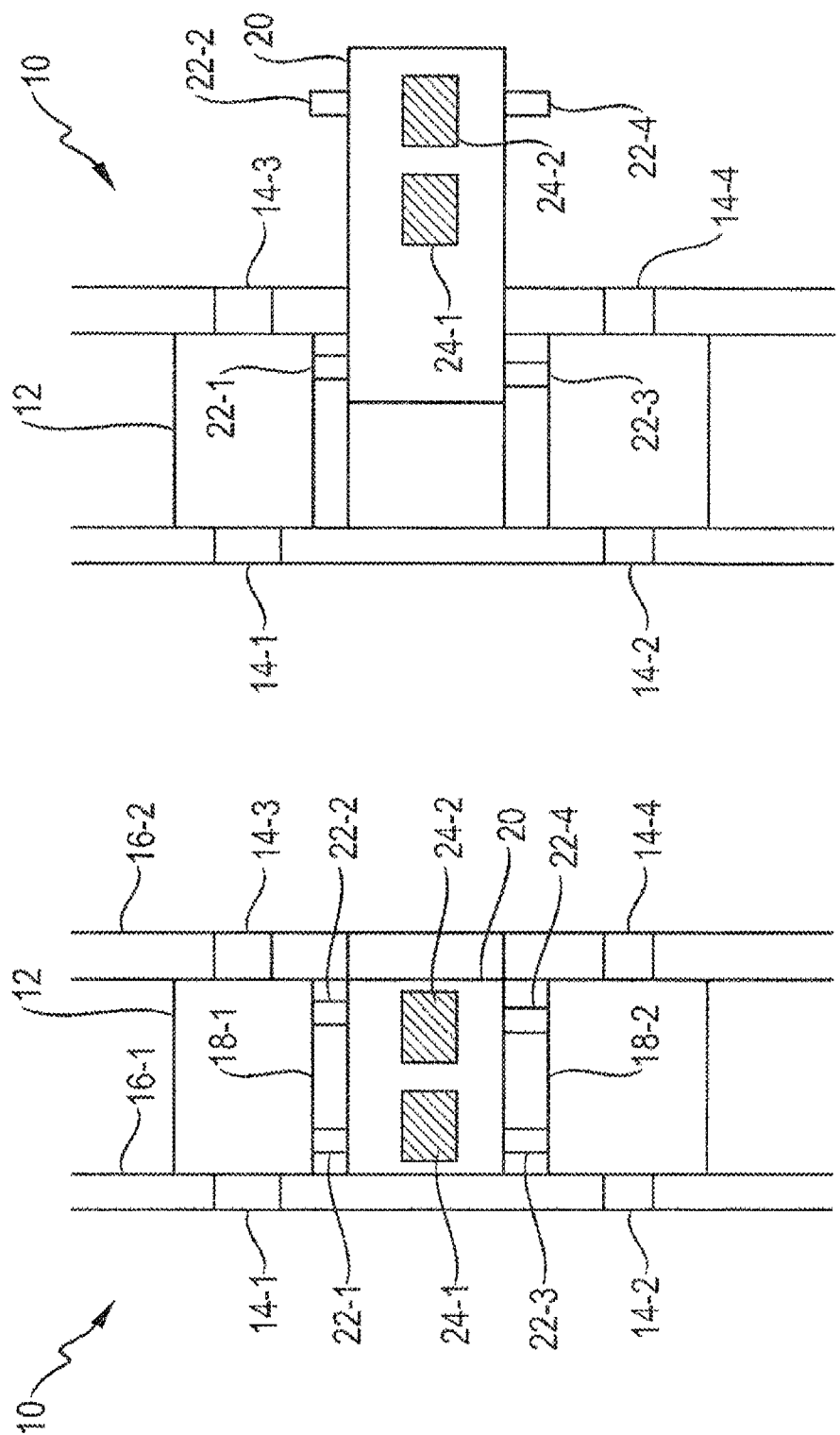
FIG. 1 shows a top view of the shuttle vehicle according to the invention with a retracted or extended telescopic system.

FIG. 1 shows a top view of a shuttle system 10 according to the invention with a retracted telescopic system 12, FIG. 1(A), and with an extended telescopic system 12, FIG. 1(B).

As shown in FIG. 1(A), the shuttle vehicle 10 for transporting stored goods in the shelving system comprises a running gear 12 having wheels 14-1, . . . , 14-4 mounted thereon in order to move the shuttle vehicle 10 along guide rails 16-1, 16-2 of the shelving system.

As shown in FIG. 1(A) and FIG. 1(B), a telescopic system 18 movably guided by the running gear 12 can be retracted and extended. This is done relative to the running gear 12 in a plane and in a self-supporting manner on both sides of the running gear.

As shown in FIG. 1(A) and FIG. 1(B), the telescopic system 18 carries storage containers 20-1, 20-2. To store the storage containers 20-1, 20-2, the telescopic system 18 is guided out on the side of the running gear 12 of the shuttle vehicle 10.

The storage containers 20-1, 20-2 are stored in the storage system by raising or lowering the telescopic system 18. For this purpose, the shuttle vehicle 10 comprises a lifting system for raising and lowering the telescopic system 18 relative to the guide rails 16-1, 16-2 of the shelving system.

This means that on the one hand the shuttle vehicle 10 as a whole can perform an upward and downward movement in order to achieve a relative movement of the loading area of the telescopic system 18 relative to the support rails 16-1, 16-2 of the shelving system.

As an alternative, the telescopic system 18 can also be moved relative to the running gear 12, provided that the guide rails 16-1, 16-2 of the shelving system run below the support rails of the shelving system.

As shown in FIG. 1, the telescopic system 18 is constructed in a single-acting manner according to the present invention. This means that the telescopic arm of the telescopic system 18 is formed as a one-part element and can thus be moved in a plane. This leads to a generally very low construction for the shuttle vehicle 10, which is of particular significance for increasing the efficiency in the shelving system.

Moreover, within the scope of the present invention, the shuttle vehicle 10 is preferably configured as a shuttle vehicle for small loads.

To move the telescopic system 18, an allocated drive can be provided at the shuttle vehicle 10, for example a chain drive. Alternatively, the telescopic system 18 can be provided with a drive of its own, for example an electric motor, by which the flexibility increases since there are no restrictions then with regard to the insertion depth into the shelving system.

With the combination of the running gear 12 and the telescopic system 18, it is possible, according to the invention, to perform a multi-depth storage in any variability.

As shown in FIGS. 1(A) and 1(B), two storage containers 20-1, 20-2 can be used, for example, for a two-depth storage. Here, shuttle vehicles load the storage system by means of the telescopic system 18 or remove the storage containers 20-1, 20-2 by means of the telescopic system 18.

According to the present invention, it is also possible, however, to handle up to four containers with a size of 400 mm×300 mm, provided that a four-depth storage is performed. On the other hand, large containers with a total weight of up to 120 kg are used for one-depth storage, and in the case of two-depth storage the containers can have a size of 600 mm×400 mm. In general, containers can commonly have a width of 300 mm to 800 mm and a length of up to 1600 mm, with the indicated dimensions merely serving as examples and not restricting the scope of protection of the present invention in any way.

All in all, in accordance with the shuttle technology according to the invention, dynamic shelf storage and commissioning applications can be used, depending on the industry, for products up to 1 t, with a telescopic system 18 being used for underfeeding, lifting and retrieving or storing. This leads to advantages e.g. for applications in the automotive industry or for the use of standardized VDA containers ("VDA"="Verband der Automobilindustrie" [German Association of the Automotive Industry]), and also for use in the market segment of eCommerce solutions.

These advantages also concern in particular efficiency and performance. In this respect, efficiency is defined in accordance with the standard ("FEM"="Fédération Européenne de la Manutention" [European Materials Handling Federation]) by storage, retrieval and rearrangement movements, in particular double movements. The performance improvement achievable within the scope of the present invention is an important advantage of the present invention.

Figure 2:
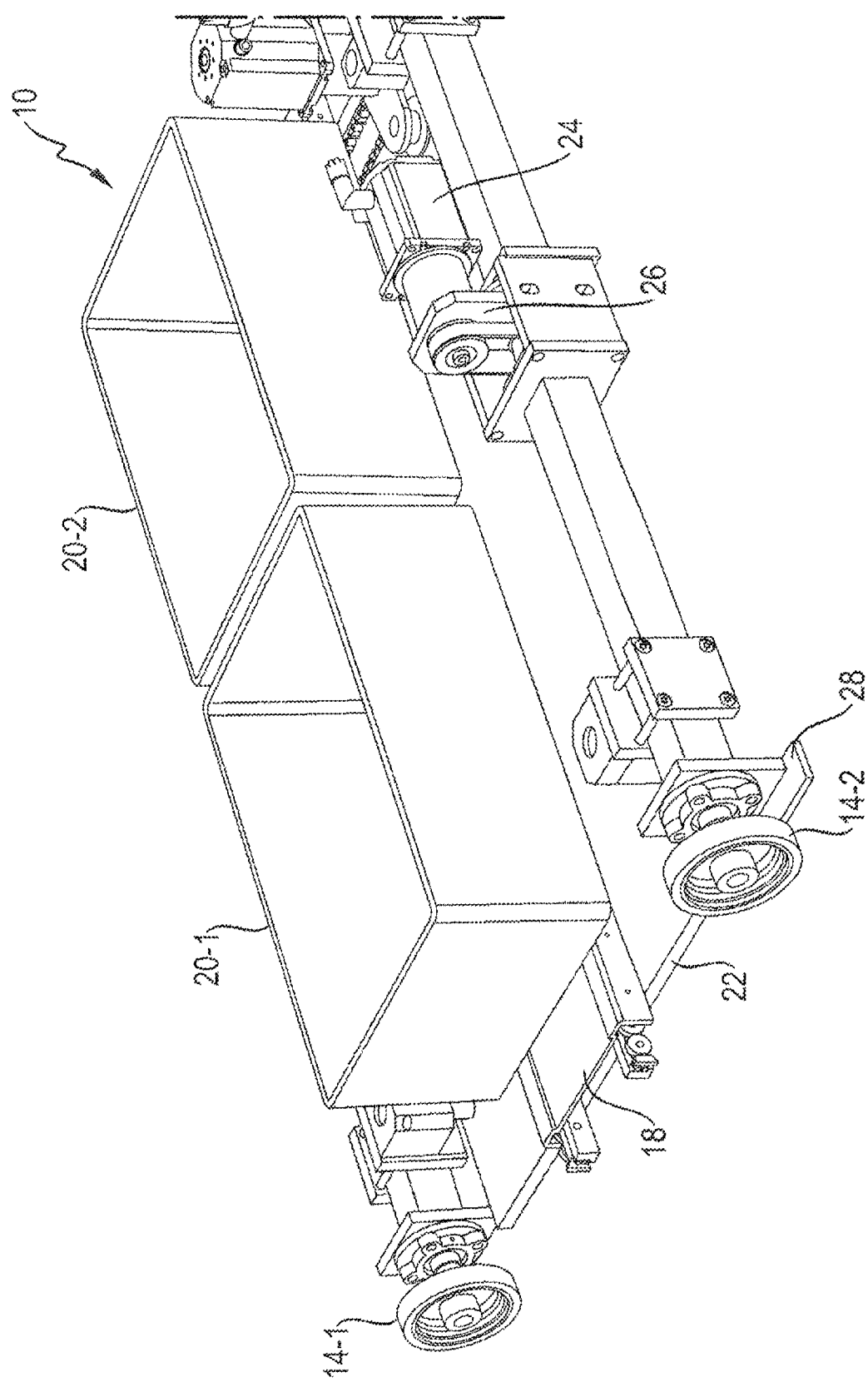
FIG. 2 shows a perspective view of the shuttle vehicle according to the invention.

FIG. 2 shows a perspective view of the shuttle vehicle according to the invention.

As shown in FIG. 2, the running gear 12 of the shuttle vehicle 10 is constructed of a base plate 22, on the corners of which the wheels 14-1, . . . , 14-4 of the shuttle vehicle 10 are mounted. The wheels 14-1, . . . , 14-4, or at least a pair of the wheels 14-1, . . . , 14-4, can be driven by means of a drive motor 24 which is coupled via a belt 26 to a rotatable shaft that connects two opposite wheels 14, 1, . . . , 14-4 of the shuttle vehicle 10.

Within the scope of the invention, it is also possible to drive either one wheel shaft of the front or rear wheel pairs, or both shafts, depending on the load of the shuttle vehicle 10.

As shown in FIG. 2, the shuttle vehicle 10 comprises on its bottom at least two counter-contact surfaces 28 allocated to a front or rear wheel pair, by means of which tilting forces occurring when the telescopic system 18 is extended can be introduced into guide rails of the shelving system.

Figure 3:
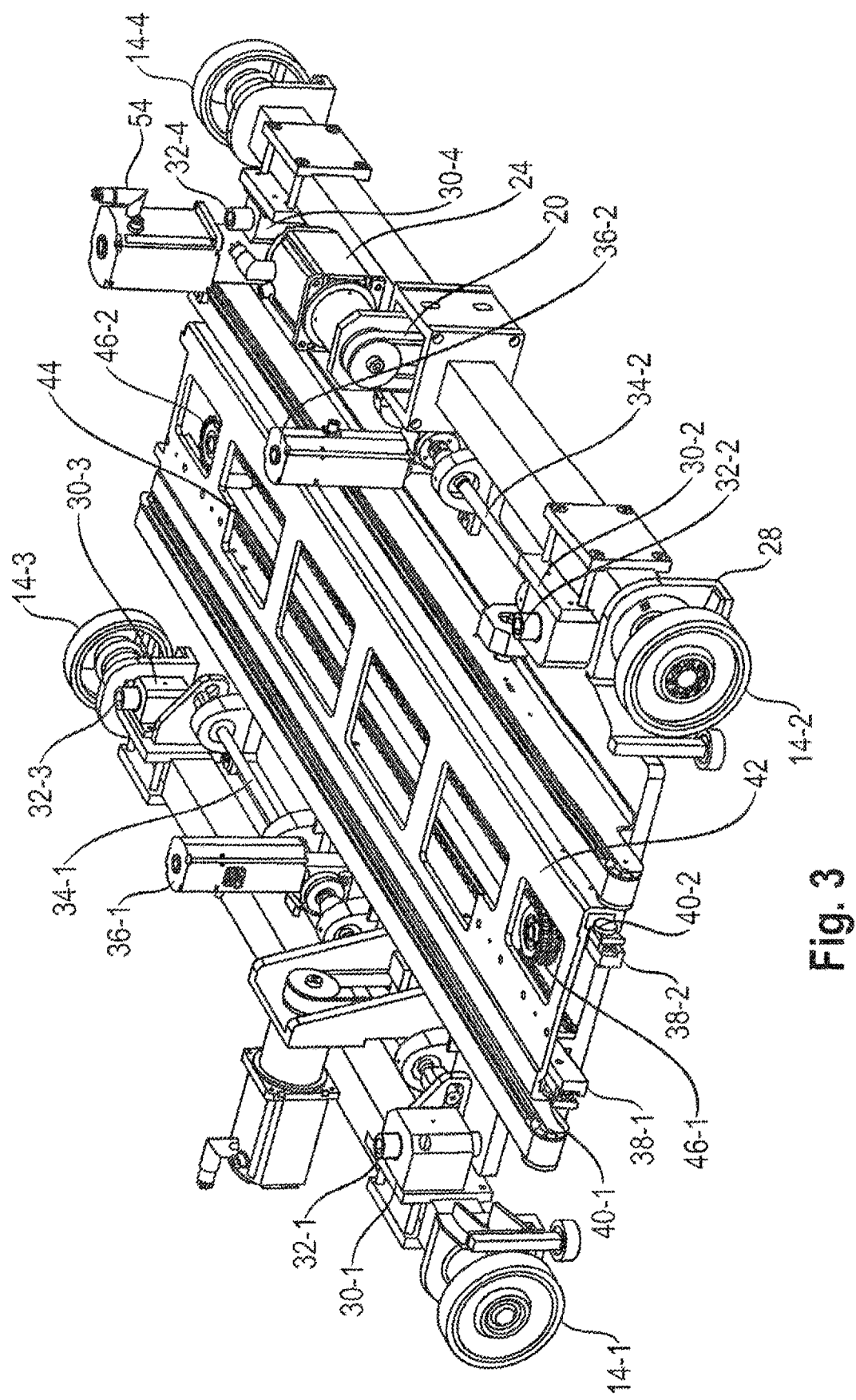
FIG. 3 shows a partial perspective view of the shuttle vehicle according to the invention.

FIG. 3 shows a partial perspective view of the shuttle vehicle 10 according to the invention.

The elements shown in FIG. 3, which correspond to those shown in FIG. 3, are designated by means of identical reference numbers, and their description is not repeated.

FIG. 3 shows in particular the configuration of a lifting system according to the invention and further details of the telescopic system 18.

As shown in FIG. 3, the lifting system for raising and lowering the telescopic system 18 can be configured relative to the running gear 12 of the shuttle vehicle 10. Alternatively, the lifting system for raising and lowering the entire shuttle vehicle 10 can be configured relative to the guide rails of the shelving system.

As shown in FIG. 3, the lifting system generally consists of holding blocks 30-1, . . . , 30-4 mounted on each corner of the running gear 12. Each holding block 30-1, . . . , 30-4 has a thoroughfare channel, in each of which a lifting column 32-1, . . . , 32-4 is guided.

As shown in FIG. 3, the height adjustment of the lifting columns 32-1, . . . , 32-4 is performed by means of drive shafts 34-1, 34-2 which are driven by allocated motors 36-1, 36-2.

FIG. 3 also shows further details of the telescopic system 18.

As shown in FIG. 3, the telescopic system 18 comprises at least one guide rail 38-1, 38-2 which are mounted on the base plate 22 such that its direction of travel are oriented towards the sides of the shuttle vehicle 10. On the guide rails 38-1, 38-2, rollers 40-1, 40-2 are provided on upper sides.

As shown in FIG. 3, the telescopic system 18 additionally comprises a loading area 42 movable along the guide rails 38-1, 38-2, which has a cross-sectional profile with lateral U partial profiles. The U partial profiles are arranged such that they engage with the rollers 40-1, 40-2 in order to guide the loading area 42 while moving.

As shown in FIG. 3, the movement of the loading area is performed by means of a drive for retracting and extending the loading area 42 relative to the shuttle vehicle 10 along the at least one guide rail 38-1, 38-2. According to FIG. 3, one option for the drive is a chain conveyor. For this purpose, a conveyor chain 44 is guided along two gear wheels 46-1, 46-2.

As shown in FIG. 3, the shuttle vehicle 10 can be equipped with a double belt conveyor technique, for which a drive motor is then provided as well. Preferably, it is provided that two conveyor belts of the double belt conveyor technique are provided along each longitudinal side of the loading area 42 of at least one telescopic system 18. More preferably, the running surfaces of the double belt conveyor technique are also spaced apart relative to the surface of the loading area 42 of the telescopic system 18 in accordance with a predetermined distance greater than zero. This distance can have a value of 5 mm to 2 cm, for example.

Moreover, it is to be noted that within the scope of the present invention any number of belt conveyor devices can be used in general, depending on the requirements. In addition, these are operated by means of a drive provided therefor. This can be an electric motor, for example (not shown in FIG. 3).

The shuttle vehicle 10 of the present invention further comprises a controller. Preferably, the controller is supplied by means of an interface for wireless communication, e.g. WLAN, with data relevant for the movement process and the loading process, which are provided by an external control system of the shelving system.

For the energy supply of the electrical consumers of the shuttle vehicle 10, an energy storage can be provided in combination with a capacitor intermediate storage technique, for example. Alternatively, energy can be supplied by means of a conductor rail along a travel passage of the shuttle vehicle 10.

Figure 4:
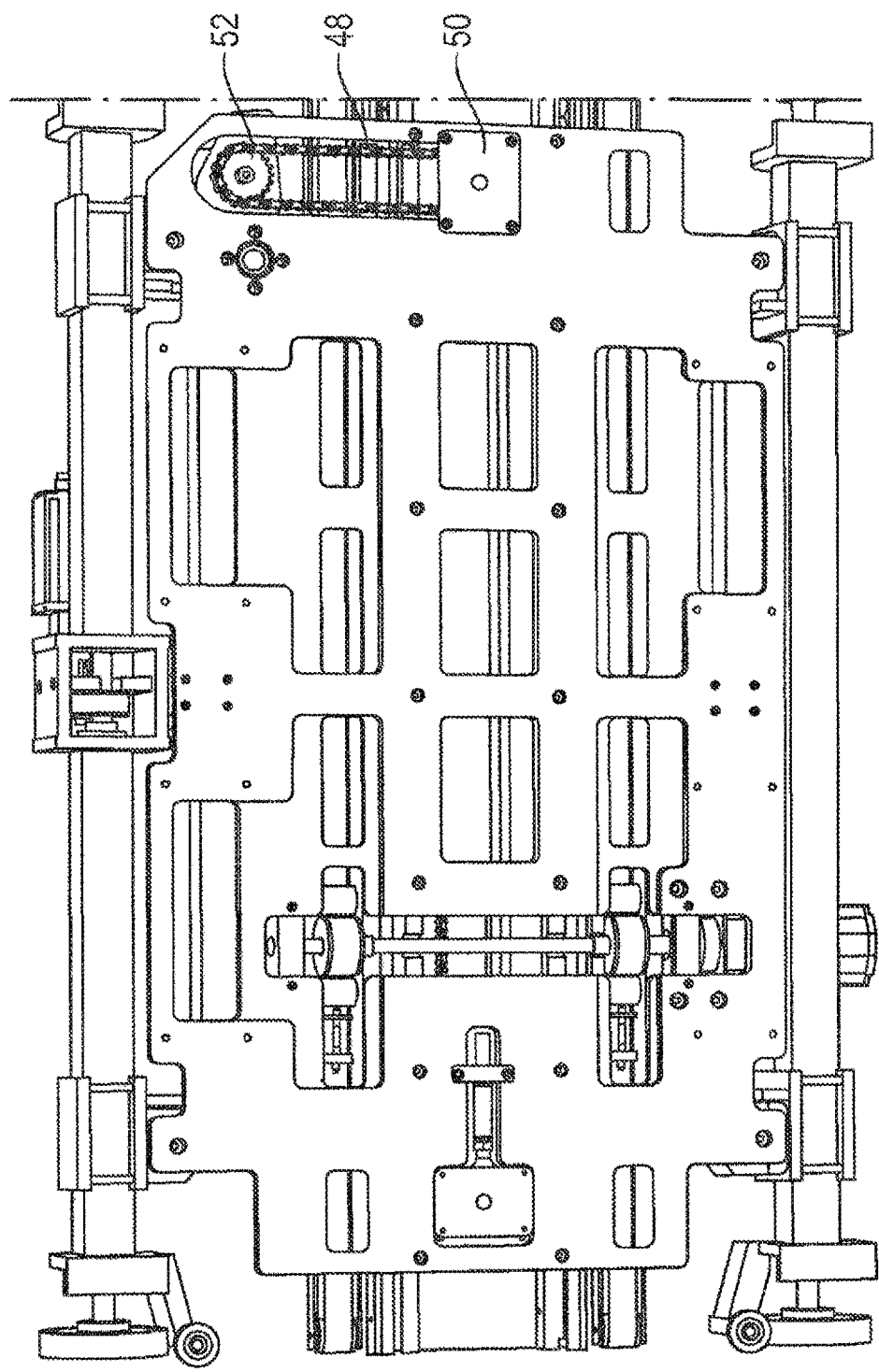
FIG. 4 shows a bottom view of the shuttle vehicle according to the invention.

FIG. 4 shows a bottom view of the shuttle vehicle 10 according to the invention.

As shown in FIG. 4, a further chain mechanism 48 is provided on the bottom of the shuttle vehicle 10, which engages with a gear wheel—hidden in FIG. 4 by means of the cover 50—that is provided correspondingly on the bottom of the gear wheel 46-1, 46-2. Moreover, a further gear wheel 52 is provided, which is configured rotatably via a drive 54 shown in FIG. 4, in order to operate through this the chain conveyor 44, 46-1, 46-2 shown in FIG. 3.

Figure 5:
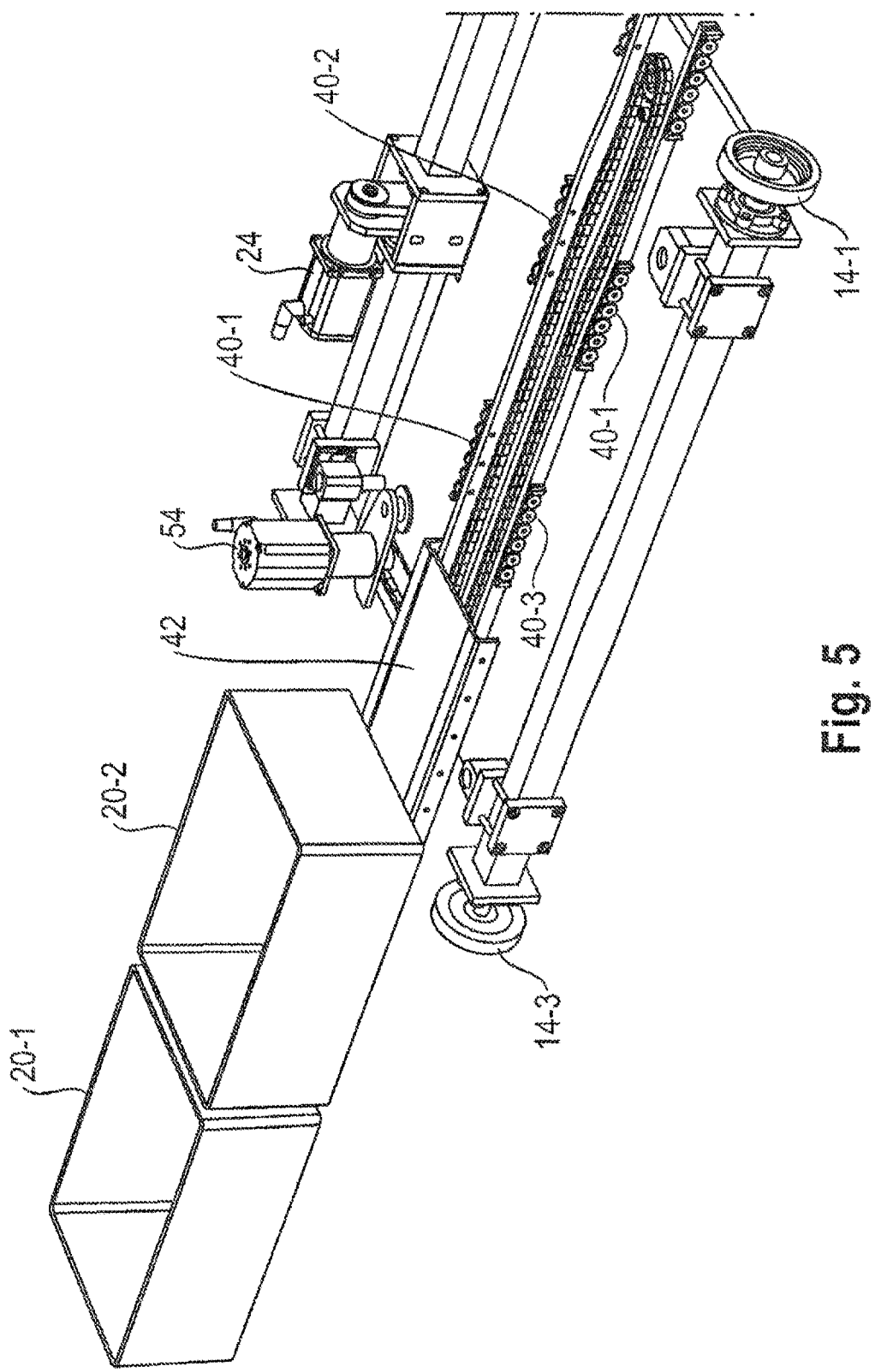
FIG. 5 shows a perspective view of the shuttle vehicle according to the invention with an extended telescopic system.

FIG. 5 shows a further perspective view of the shuttle vehicle 10 according to the invention with an extended telescopic system 18.

As shown in FIG. 5, stored goods can be carried in load carriers 20-1, 20-2 with a predetermined length, height and width. In this respect, the loading area 42 of the telescopic system 18 has, in the case of two-depth storage, a length which is twice the length and/or width of the load carriers 20-1, 20-2.

As shown in FIG. 5, the shuttle vehicle 10 is provided with a single-acting telescopic system 18 which can be extended on the right or left. In this respect, single-acting means extending in one plane in order to achieve a minimum construction height.

As shown in FIG. 5, a minimum overlapping of the telescopic system 18 with the shuttle vehicle 10 is to be observed when the telescope 18 is extended, so that occurring tilting forces can be picked up.

According to the invention, any number of containers can be stored in an angular shelf by means of the combination of a telescopic system 18 with a lifting drive in the case of a small construction height, with a limitation being given only by the length of the telescopic system 18.

According to the present invention, the shuttle vehicle 10 can also comprise a variable number of telescopic systems 18 which can be operated independently of each other.

FIG. 6 shows a side view, a top view and a front view of a shuttle vehicle according to the invention, which is positioned in a shelving system according to the invention.

Figure 6A:
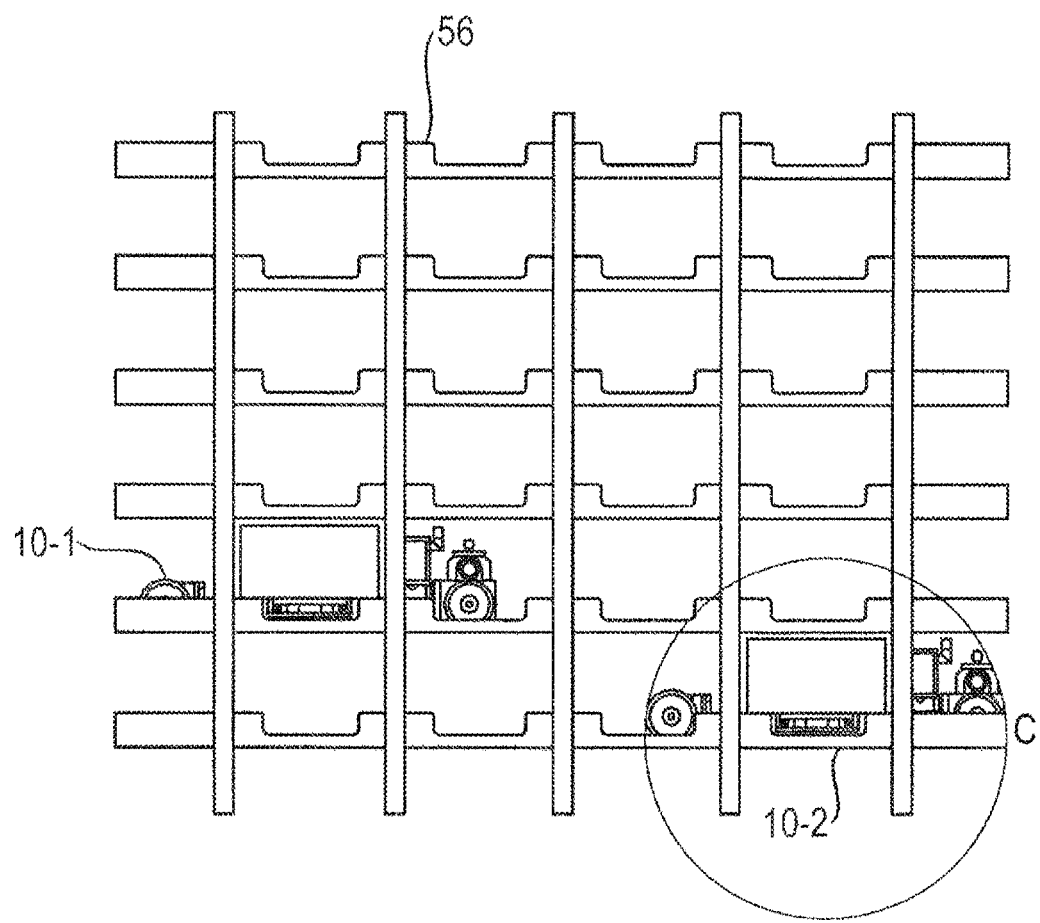
FIG. 6 shows a side view, a top view and a front view of a shuttle vehicle according to the invention, which is positioned in a shelving system according to the invention.

As shown in FIG. 6(A), the storage boxes of the shelving system according to the invention have recesses 56 in the guide rails, so that the telescopic system 18 of each shuttle vehicle 10-1, 10-2 can be retracted and extended with respect to the storage boxes.

Figure 6B:
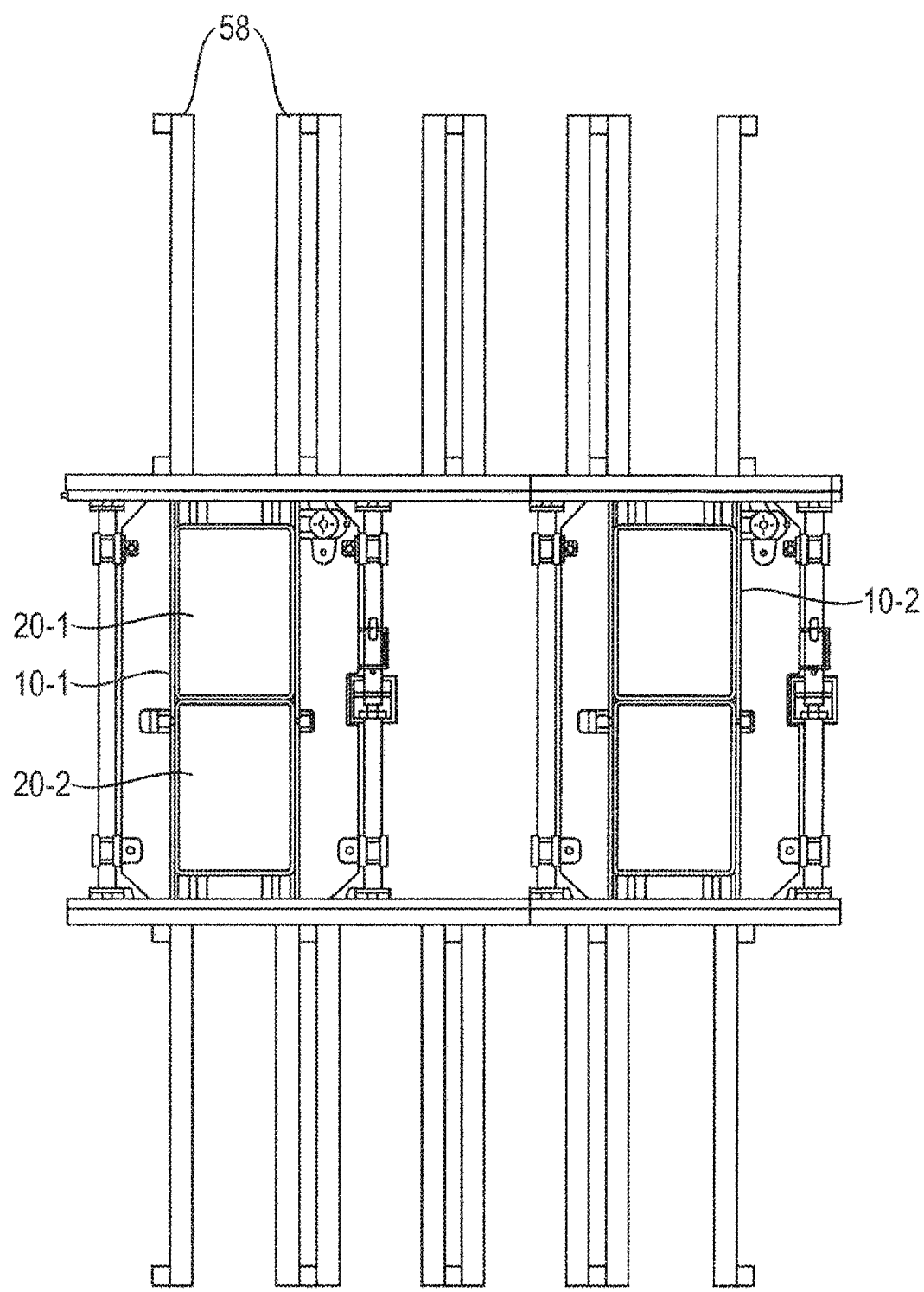

As shown in FIG. 6(B), each storage box has bearing surfaces 58, the distance of which is determined by dimensions between the storage containers 20-1, 20-2. Preferably, the contact surfaces are configured as angular rails in order to provide support, also laterally, for the storage containers 20-1, 20-2 after retracting.

As shown in FIG. 6(C), the bearing surfaces 58 of the shelving system are arranged higher as compared to the guide rails of the shuttle passage in the shelving system. Accordingly, the storage containers 20-1, 20-2 are successfully deposited by raising the same, by retracting the storage containers into the shelf, and by subsequently lowering the telescopic system 18. As stated above, this can be done either by raising the telescopic system 18 relative to the running gear of the shuttle vehicle 10. Alternatively, the shuttle vehicle 10 as a whole can be raised such that the loading area of the telescopic system is arranged higher than the bearing surfaces 58 of the shelving system.

Figure 7:
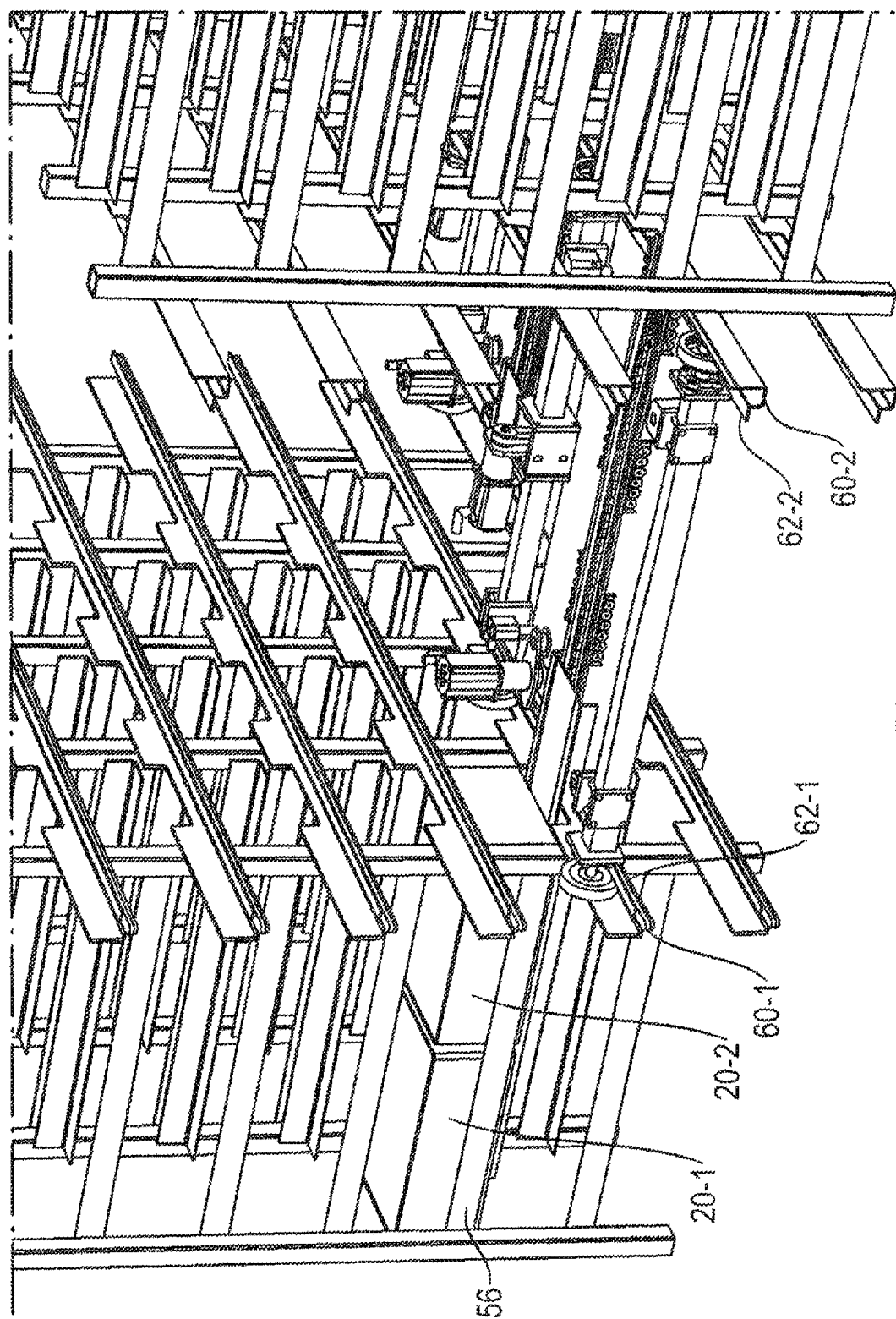
FIG. 7 shows a perspective view of a shuttle vehicle according to the invention, which is positioned in a shelving system according to the invention.

FIG. 7 shows a perspective view of a shuttle vehicle 10 according to the invention, which is positioned in a shelving system according to the invention.

As shown in FIG. 7, the shelving system according to the invention comprises at least one storage plane, in which a plurality of storage boxes is arranged at right angles. In the shelving system, at least one shuttle passage per location running straight between opposite outer sides of the shelving system is provided, comprising guide rails 60-1, 60-2 running along storage boxes of this storage plane. Moreover, the shuttle vehicle 10 according to the invention can be moved along the guide rails 60-1, 60-2 of the shuttle passage in the at least one shuttle passage of the storage system for storing and retrieving stored goods.

As shown in FIG. 7, L-shaped holding rails 58 are provided per storage box which run in parallel, the distance of which is greater than the width of the loading area 42 of the telescopic system 18. Thus, when the height of the loading area 42 changes, the loading area between the holding rails 58 can be moved in height direction in order to raise and lower the storage containers 20-1, 20-2 with respect to the holding rails 58 and subsequently retract or extend the telescopic system 18, depending on whether the storage containers 20-1, 20-2 are stored or retrieved.

As also shown in FIG. 7, the cross-sectional profile of the guide rails 60-1, 60-2 of each shuttle passage has a contact surface 62-1, 62-2 which forms a counterpart to a counter-contact surface 28—shown in FIG. 3—of the shuttle vehicle 10. Thus, a tilting of the shuttle vehicle 10 can be prevented by engagement of a contact surface 62-1, 62-2 and the counter-contact surface 28 when the telescopic system 18 of the shuttle vehicle 10 is extended.

Figure 8:
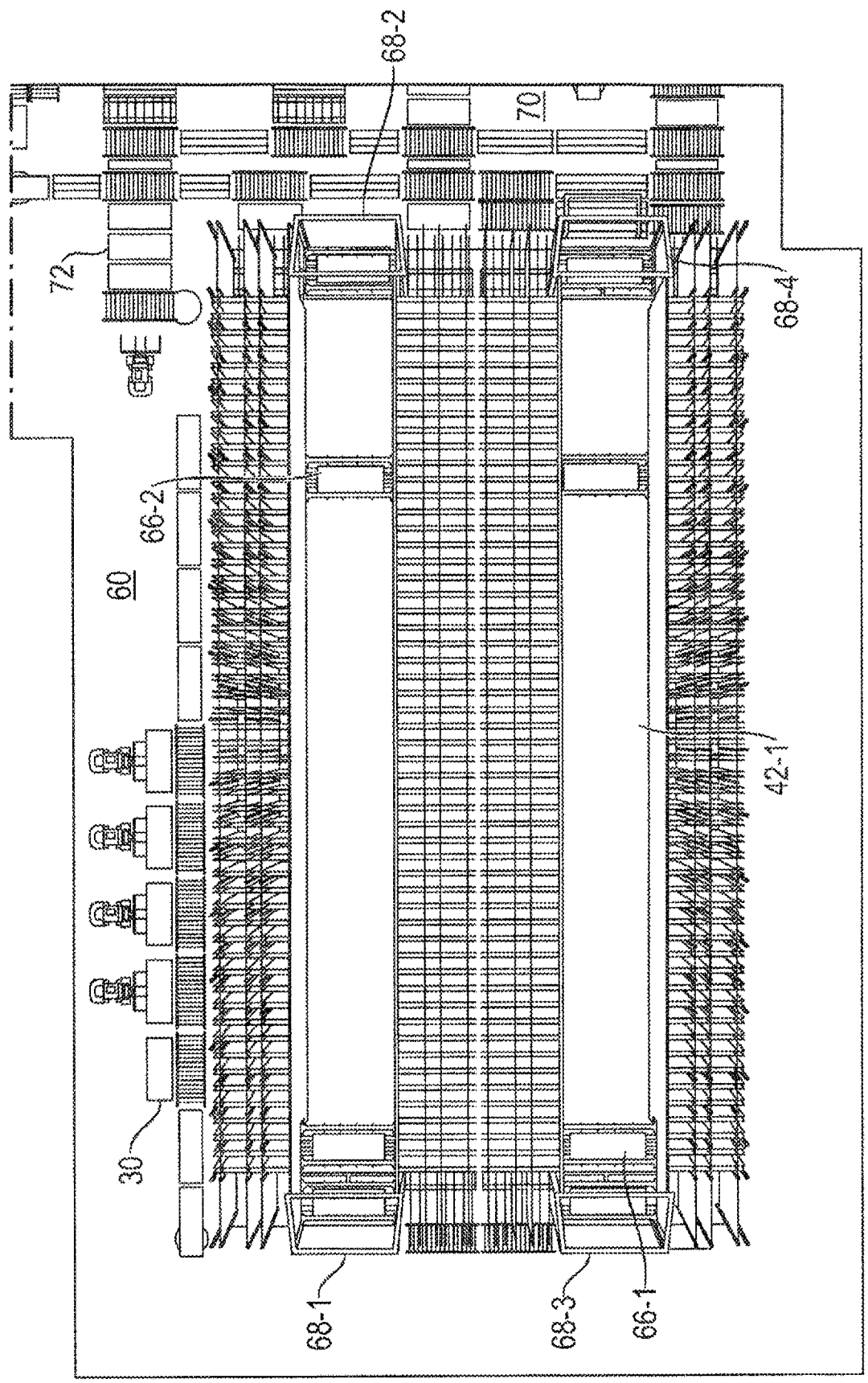
FIG. 8 shows a top view of a storage system according to the invention.

FIG. 8 shows a top view of a shelving system according to the invention, which is operated together with at least one shuttle vehicle 10 according to the present invention.

As shown in FIG. 8, the shelving system 64 comprises at least one storage plane, in which a plurality of storage boxes is arranged at right angles.

As shown in FIG. 8, the shelving system 64 comprises at least one shuttle passage 66-1, 66-2 per storage plane running straight between opposite outer sides of the shelving system 64, which extend along the storage boxes of each storage plane.

Moreover, the shelving system 64 according to the present invention comprises at least one shuttle vehicle 10, as described in accordance with FIG. 1 to FIG. 3. The shuttle vehicle 10 can be moved in the at least one shuttle passage 66-1, 66-2 of the storage system 64 in order to store and retrieve stored goods by means of the telescope technique according to the invention.

As shown in FIG. 8, at least one lift system 68-1, 68-2, 68-3, 68-4 is provided on the outer sides of the shelving system 64 in order to transfer a shuttle vehicle 10 and/or stored goods between different storage levels in height direction with respect to the individual storage planes of the shelving system 64.

As shown in FIG. 8, at least one conveyor or lift system 68-1, 68-2, 68-3, 68-4 operatively serves a front zone 70 of the shelving system 64. In this respect, a supplying and a discharging conveyor technique 72 is arranged opposite the lift system.

FIG. 9 shows a perspective view of the shelving system according to the invention.

As shown in FIG. 9, the conveyor or lift systems 68-1, 68-2, 68-3, 68-4 are each provided at the end of a shuttle passage. With the conveyor or lift systems 68-1, 68-2, 68-3, 68-4, shuttle vehicles 10 can be carried between planes of the shelving system 64 or to the front zone 70. According to the invention, a combination of product conveyor and shuttle conveyor can also be used. Since conveyor belts can be loaded along the longitudinal side of the shelving system 64, an advantage is achieved to the effect that a possibility of a combination with standardized goods to person commissioning spaces is also possible.

Moreover, according to the invention, shuttle vehicles 10 including stored goods can be transferred by the conveyor or lift systems 68-1, 68-2, 68-3, 68-4. Several shuttle vehicles 10 per plane of the shelving system 64 can be used. A combination of product and shuttle vehicle transfer is also possible.

With regard to the shelving system 64 shown in FIG. 9, a standardized procedure as follows results:

The shuttle conveyor or the lift system brings the shuttle vehicle 10 into the front zone 70. There, the shuttle vehicle 10 accommodates the product to be stored. The conveyor or lift system 68-2, 68-4 brings the shuttle vehicle 10 with the product into the logistically correct plane, where the shuttle vehicle 10 drives into the plane and subsequently stores the product to be stored in the storage box provided therefor. This procedure can be applied in reverse order during retrieval.

By providing several lift systems, a route-optimized and likewise redundant procedure can be ensured.

As shown in FIG. 9, a further advantage of the present invention lies in the combination of the storage function with the commissioning function directly on the basis of the shelving system 64 and/or a separate arrangement at the shelving system 64. Thus, increasing requirements in the environment of Industry 4.0 system solutions are fulfilled, with regard to storing, buffering, commissioning and for an optimum solution of the superordinate communication by means of WLAN. The shuttle technology according to the invention is characterized by a lower energy consumption and a solution that is very gentle on the product.

In the area of the front zone 70, the shuttle vehicle 10, after being carried by the lift into the correct height position, can deliver the stored goods on one side to the conveyor technique and pick up the stored goods on the other side from the conveyor technique. In this respect, the delivery and the pick-up are performed by means of the telescope technique or, if necessary, also by means of a chain conveyor arranged at the shuttle vehicle 10. Conveyor technique connections can be configured in multiple layers or on one side. Connections on both front sides of the shelf or along the shelving system 64 at the position of a space for the transfer to a shuttle vehicle 10 are also possible.

According to the invention, if very high efficiency is required, one lift system or several lift systems can be provided on one side of the shelving system 64 for transferring stored goods. In this case, shuttle vehicles 10 transport in the respective planes only the stored goods to the defined transfer station, preferably at the end of the shuttle passages.

From there, the containers, products etc. are then brought into the front zone 70 with the supplying and discharging conveyor technique by means of lift systems configured as conveyors for stored goods.

A transfer of the shuttle vehicles 10 from one shuttle passage to another shuttle passage in the horizontal direction is also possible within the scope of the present invention.

According to the invention, one or several commissioning conveyor shelves can be combined with the shelving system 64. This leads to a particularly advantageous storage and material handling control of the entire system. Moreover, depending on the efficiency requirements, the number of the shuttle vehicles 10 used within the scope of the shelving system can be determined variably.

If commissioning conveyor shelves are arranged along the shelving system 64 for commissioning, these are filled on the upper side, i.e. the side of the moving path, by the shuttle vehicle 10. On the bottom, products can be removed from the containers or directly the load carriers. Empty load carriers can be brought back via a conveyor shelf route descending with respect to the shuttle passage. On the bottom end, the stored goods are retrieved in this case in turn by the shuttle vehicle 10 by means of the telescopic underfeeding technique. If the interface to the shuttle vehicle 10 is configured by means of a driven conveyor technique, a double belt conveyor technique can be used at the shuttle vehicle 10 for retrieval.

For commissioning, the conveyor shelves are provided with display systems such as "pick-by-light" or "pick-by-voice", for example.

All in all, the present invention allows the use of a very low, single-acting underfeeding telescope which in combination with a shelving system 40 allows multi-depth storages. Consequently, a conveyor shelf can be operated actively by means of a telescopic system 18 during filling and removal. As a result, the present invention achieves a multi-depth storage by the telescopic system 18 which can be raised and lowered via a lifting system at the shuttle vehicle 10.

The invention claimed is:

1. A shuttle vehicle for transporting stored goods in a shelving system, the shuttle vehicle comprising:
a running gear having wheels mounted thereon to move the shuttle vehicle along guide rails of the shelving system;
a telescopic system movably guided at the running gear, the telescopic system configured to be retracted and extended relative to the running gear in a plane in a self-supporting manner on both sides of the running gear; and
a lifting system configured to raise and lower the telescopic system relative to the guide rails of the shelving system,
wherein the lifting system is configured relative to the running gear of the shuttle vehicle, and
wherein the lifting system includes holding blocks mounted on each corner of the running gear, the holding blocks including thoroughfare channels oriented along the lifting direction, the channels configured to accommodate lifting columns, which are retractable and extendable using an allocated drive.

2. The shuttle vehicle according to claim 1, wherein the telescopic system includes a dedicated drive of its own to retract and extend the telescopic system relative to the running gear.

3. The shuttle vehicle according to claim 1, wherein the telescopic system comprises:
at least one guide rail mounted on the running gear, the at least one guide rail having a direction of travel oriented towards the sides of the shuttle vehicle, and rollers mounted on upper sides of the at least one guide rail;
a loading area movable along the guide rails, the loading area having a cross-sectional profile with partial profiles such that the rollers engage with the partial profiles to guide the loading area while moving; and
a drive configured to retract and extend the loading area relative to the shuttle vehicle along the at least one guide rail.

4. The shuttle vehicle according to claim 3, wherein the drive includes chain conveyors.

5. The shuttle vehicle according to claim 1, wherein the lifting system is configured relative to the guide rails of the shelving system.

6. The shuttle vehicle according to claim 1, further comprising at least one support roller or at least one counter-contact surface located at a bottom of the shuttle vehicle and configured to introduce tilting forces into guide rails of the shelving system when the telescopic system is extended.

7. The shuttle vehicle according to claim 1, wherein stored goods can be carried in load carriers of a predetermined length, height and width, the telescope system having a loading area with a length which is an integer multiple of the length and/or width of the load carriers.

8. The shuttle vehicle according to claim 1, further comprising at least one drive for a travel drive of the shuttle vehicle, at least one drive for the lifting system, and at least one drive for retracting and extending the telescopic system.

9. The shuttle vehicle according to claim 1, further comprising conveyor belts of a double belt conveyor technique provided along each longitudinal side of the loading area of the telescopic system, the conveyor belts including running surfaces having a predetermined distance greater than zero relative to the surface of the loading area of the telescopic system.

10. The shuttle vehicle according to claim 1, further comprising a controller having an interface configured for wireless communication in order to perform data communication with an external control system.

11. The shuttle vehicle according to claim 1, further comprising an energy storage or a sliding contact.

12. A shelving system, comprising:
at least one storage plane, in which a plurality of storage boxes is arranged at right angles;
at least one shuttle passage per storage plane running straight between opposite outer sides of the shelving system, the at least one shuttle passage comprising guide rails running along storage boxes of the storage plane; and
a shuttle vehicle being movable along the guide rails of the shuttle passage in at least one shuttle passage of the storage system for storing and retrieving stored goods, the shuttle vehicle comprising:
a running gear having wheels mounted thereon to move the shuttle vehicle along the guide rails of the shelving system;
a telescopic system which is movably guided at the running gear, the telescopic system including a dedicated drive of its own to retract and extend the telescopic system relative to the running gear in a plane in a self-supporting manner on both sides of the running gear; and
a lifting system configured to raise and lower the telescopic system relative to the guide rails of the shelving system,
wherein the cross-sectional profile of the guide rails of each shuttle passage has a contact surface which forms a counterpart to a counter-contact surface of the shuttle vehicle, wherein a tilting of the shuttle vehicle is prevented by engagement of the contact surface and the counter-contact surface when the telescopic system of the shuttle vehicle is extended.

13. The shelving system according to claim 12, further comprising L-shaped holding rails provided at the storage boxes in relation to the storage containers which run in parallel, the distance of which is greater than the width of the loading area of the telescopic system.

14. The shelving system according to claim 12, wherein conductor rails are provided along each shuttle passage in order to supply the shuttle vehicle with energy.

15. The shelving system according to claim 12, further comprising at least one lift system on an outer side of the shelving system configured to transfer a shuttle vehicle and/or stored goods between different storage levels in height direction.

16. The shelving system according to claim 15, wherein the lift system operatively serves a front zone of the shelving system, where the front zone includes a supplying and a discharging conveyor technique arranged opposite the lift system.

17. The shelving system according to claim 12, wherein conveyor shelves are arranged along the shelving system, which can be filled on their upper side using a shuttle vehicle and on the bottom of which stored goods can be retrieved by a shuttle vehicle.

* * * * *